Patented Aug. 30, 1938

2,128,256

UNITED STATES PATENT OFFICE 2,128,256

AZO DYESTUFFS

Hans Krzikalla and Hanns Ufer, Ludwigshafen-on-the-Rhine, Bernd Eistert, Mannheim, and Gustav Klaproth, Ludwigshafen-on-the-Rhine, Germany, assignors to General Aniline Works, Inc., New York, N. Y., a corporation of Delaware No Drawing. Original application December 18, 1935, Serial No. 55,040. Divided and this application July 16, 1936, Serial No. 90,944. In Germany December 22, 1934

7 Claims. (Cl. 260—200)

The present invention relates to the production of new azo dyestuffs. This application has been divided out from our copending application Ser. No. 55,040, filed December 18, 1935.

We have found that new valuable azo dyestuffs are obtained if the coupling components and the diazo compounds employed in the preparation of the new dyestuffs are so chosen that the molecule of the dyestuff contains at least one sulphonic acid group and at least one basic group of the general formula

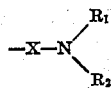

in which $R_1$ and $R_2$ may be identical or different and may be hydrogen or alkyl, cycloalkyl, hydroxyalkyl or aralkyl radicles or members of a saturated ring system and X is an aliphatic radicle combined with an aromatic nucleus of the dyestuff molecule either directly or by means of a non-basic bridge. As non-basic bridges may be mentioned for example —O—, —S—, —CO—, —SO₂—, —O—CO—, —NH—CO—, —SO₂—NH— and —CO—NH—.

Dyestuffs of the said kind may also be prepared by introducing at least one basic group of the said general formula into a dyestuff which does not yet contain such a basic group combined in the manner described above.

Thus for example a diazotizable amine having the formula:

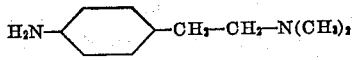

may be prepared by converting para-nitrophenyl-ethyl alcohol by means of thionyl chloride into para-nitro-omega-chlorethyl-benzene, reacting the latter with dimethylamine and reducing the nitro group in the resulting amine.

An amine having the formula:

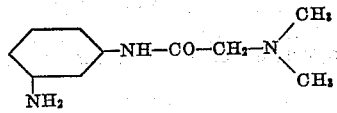

is obtainable for example by the reaction of meta-nitroaniline with chloracetyl chloride, treatment of the resulting chloracetyl-meta-nitro-anilide with dimethylamine and subsequent reduction of the nitro group.

By the reaction of meta-nitro-omega-chloracetophenone with ethylamine and subsequent reduction of the nitro group, an amine is obtained having the formula:

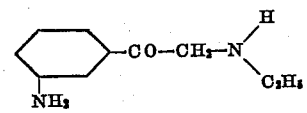

From 1-brom-2-(diethylamino)-ethane and para-acetamino-thiophenol, a sulphide is obtained having the formula:

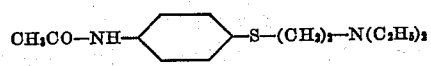

which may be saponified as such to form the amine or may first be oxidized to form the sulphone having the formula:

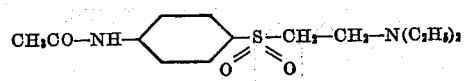

and then saponified.

The amines prepared according to the above methods or by other known methods and having external basic groups are capable of diazotization in the same way as ordinary aromatic amines and yield azo dyestuffs of the said kind by coupling with compounds which are capable of coupling.

Coupling components having external basic groups are obtained for example by reacting 2-amino-8-hydroxynaphthalene-6-sulphonic acid with chloracetyl chloride or a chlorpropionic acid chloride and treating the resulting 2-(chloracylamino)-8-hydroxynaphthalene-6-sulphonic acid with piperidine, dimethylamine or other nitrogen bases which have at least one reactive hydrogen atom. By reacting 2-acetoxy-3-naphthoic acid chloride with N-diethyl-ethylenediamine and then splitting off the acetyl group, a naphthol is obtained having the formula:

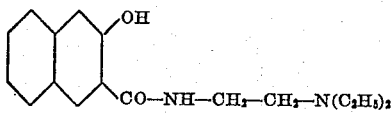

Further suitable coupling components are for example the pyrazolones prepared from the above amines by the usual methods, and also the acetoacetyl or benzoyl-acetyl and 2-hydroxy-3-naphthoyl compounds of the said amines. These coupling components may be coupled with any desired diazotized aromatic amines to yield dyestuffs of the said kind.

If the coupling component employed contains an amine group, the mono azo dyestuff prepared may be diazotized and the diazo compound be coupled with any desired coupling component. Disazo dyestuffs are thus obtained with excellent properties as regards levelling power and fastness.

The introduction of the external basic radicle of the general formula

in which X stands for an aliphatic radicle into aminoazo or hydroxyazo dyestuffs is effected in a similar manner.

The azo dyestuffs obtainable according to this invention and having external basic groups are distinguished by an excellent levelling power and for the most part by good to very good fastness to washing and fulling. When the dyestuffs contain groups which are capable of being exchanged by metals, they may be converted in substance or on the fibre into their complex metal compounds.

The following examples will further illustrate how the said invention may be carried out in practice but the invention is not restricted to these examples. The parts are by weight.

*Example 1*

107 parts of para-toluidine are diazotized in the usual manner and the diazo solution is stirred into a solution, rendered alkaline with sodium carbonate, of 340 parts of 2-(dimethyl-amino-acetyl)-amino -8- hydroxynaphthalene-6-sulphonic acid, having the formula

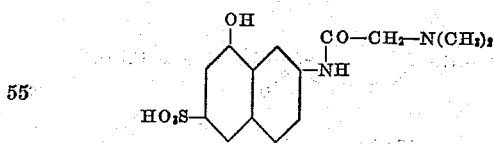

and the mixtures worked up in the usual manner. The dyestuff obtained dyes wool uniform carmine-red shades of good fastness to washing.

By starting from the following diazotized compounds dyestuffs having a good levelling power and good fastness to washing are obtained, giving the following color shades:

Sulphanilic acid_____ Red.
Aminoazobenzene sulphonic acid___ Bordeaux red.
1-methyl-3- amino -6- chlorben-
  zene-4-sulphonic acid_____ Brown-red.
1- aminonaphthalene -2- sulphonic
  acid_____ Blue-red.

If, instead of the 2-(dimethylaminoacetyl)-amino -8- hydroxynaphthalene -6- sulphonic acid the corresponding 3,6-disulphonic acid be employed, dyestuffs of similar shades and properties are obtained. By employing 1-(dimethylaminoacetyl)-amino-8-hydroxynaphthalene-3,6-disulphonic acid, yellower dyestuffs are in general obtained.

*Example 2*

208 parts of p-amino-omega-diethylaminophenetol are diazotized in the presence of 350 parts of concentrated hydrochloric acid and 1000 parts of water with 69 parts of sodium nitrite. The diazo solution thus obtained is added to an aqueous solution, containing such an amount of sodium hydroxide to neutralize the hydrochloric acid, of 213 parts of the sodium salt of 1-aminonaphthalene-7-sulphonic acid. The mono-azo dyestuff thus prepared is salted out, separated, dissolved again under the addition of acid and diazotized with sodium nitrite. The diazo solution thus obtained is added to an aqueous solution, containing such an amount of sodium acetate to neutralize the acid, of 289 parts of the sodium salt of 1-phenylaminonaphthalene-8-sulphonic acid. A disazo dyestuff is thus obtained which dyes wool beautiful blue shades of good fastness to washing and fulling.

Instead of para-amino-omega-diethylaminophenetol other amines containing external basic groups may be employed. As amines of this kind there may be mentioned 4-aminobenzyl-dimethyl-amine, 3 - amino - 4 - methylphenyl - 1 - omega -(dimethylaminoethyl) - sulphone, 3 - amino -4- methoxyphenyl - omega -(dimethylamino - ethyl) -sulphone or the corresponding di-ethyl-compounds. Instead of 1-amino-naphthalene-7-sulphonic acid there may also be employed as the first coupling component 1-aminonaphthalene-6-sulphonic acid or a mixture of these two acids. Instead of 1 - phenylamino - naphthalene -8- sulphonic acid there may be employed as the second coupling component the 1-(4'-methylphenyl)-aminonaphthalene-8-sulphonic acid.

If the amine used for the preparation of the diazo component already contains a sulphonic acid group 1-amino-naphthalene may be employed as the first coupling component in this case.

What we claim is:—

1. Azo dyestuffs corresponding to the general formula

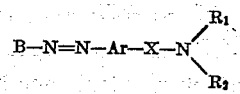

wherein Ar stands for an aromatic radical, the group

stands for a basic radical selected from the group consisting of —$NH_2$, primary and secondary alkyl, hydroxyalkyl, aralkyl and cycloalkyl amino groups and the radicals of hydrogenated heterocyclic nitrogen compounds including the N atom, X stands for a chain containing carbon atoms, which is free from a basic action, and, B stands for the radicle of an aromatic azo compound, and in which at least one of the radicals marked Ar and B contains a sulphonic acid group.

2. Azo dyestuffs corresponding to the general formula

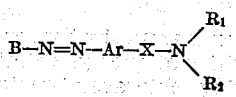

wherein Ar stands for an aromatic radical, the group

stands for a basic radical selected from the group consisting of —NH₂, primary and secondary alkyl, hydroxyalkyl, aralkyl and cycloalkyl amino groups and the radicals of hydrogenated heterocyclic nitrogen compounds including the N atom, X stands for a chain containing carbon atoms, which is free from a basic action, and, B stands for a radicle corresponding to the general formula:

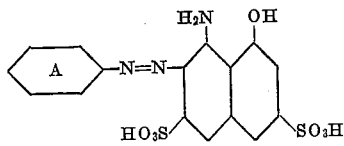

in which the nucleus marked A contains at least one substituent of the class consisting of halogen atoms and nitro groups.

3. The azo dyestuff corresponding to the formula

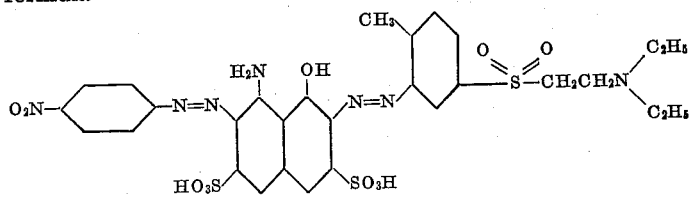

4. Azo dyestuffs corresponding to the general formula

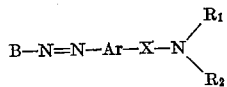

wherein Ar stands for an aromatic radical, the group

stands for a basic radical selected from the group consisting of —NH₂, primary and secondary alkyl, hydroxyalkyl, aralkyl and cycloalkyl amino groups and the radicals of hydrogenated heterocyclic nitrogen compounds including the N atom, X stands for a chain containing carbon atoms, which is free from a basic action, and, B stands for a radicle corresponding to the general formula

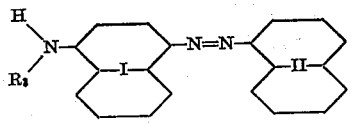

in which at least one of the naphthalene nuclei I and II contains at least one sulphonic acid group and in which R₃ stands for hydrogen or a radicle of the benzene series.

5. The azo dyestuff corresponding to the formula

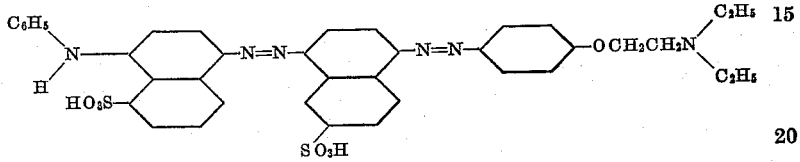

6. Azo dyestuffs corresponding to the general formula

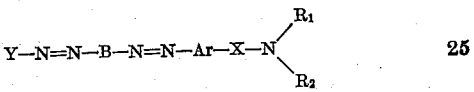

wherein Ar stands for an aromatic radical, the group

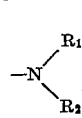

stands for a basic radical selected from the group consisting of —NH₂, primary and secondary alkyl, hydroxyalkyl, aralkyl and cycloalkyl amino groups and the radicals of hydrogenated heterocyclic nitrogen compounds including the N atom, X stands for a chain containing carbon atoms, which is free from a basic action, and, B stands for the radicle of a condensation product of 1 molecular proportion of phosgene with 2 molecular proportions of an amino-hydroxynaphthalene sulphonic acid and in which Y stands for a radicle of the benzene series.

7. The azo dyestuff corresponding to the formula

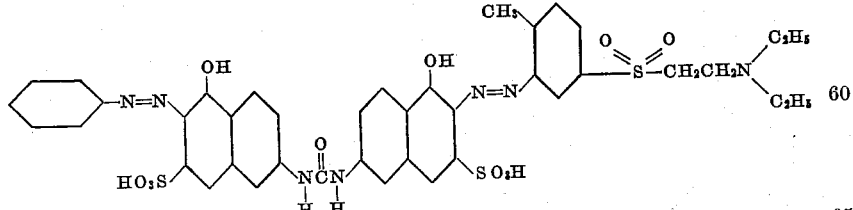

HANS KRZIKALLA.
HANNS UFER.
BERND EISTERT.
GUSTAV KLAPROTH.